US009709403B2

(12) United States Patent
Raglund

(10) Patent No.: US 9,709,403 B2
(45) Date of Patent: Jul. 18, 2017

(54) METHOD AND A SYSTEM FOR TRACKING AND ANALYZING A TRAJECTORY OF A MOVING OBJECT, AND FOR PROVIDING A SCORE OF SUCH A TRAJECTORY

(71) Applicant: Vesa Saynajakangas, Espoo (FI)

(72) Inventor: Jari Raglund, Espoo (FI)

(*) Notice: Subject to any disclaimer, the term of this patent is extended or adjusted under 35 U.S.C. 154(b) by 665 days.

(21) Appl. No.: 14/193,643

(22) Filed: Feb. 28, 2014

(65) Prior Publication Data

US 2015/0247727 A1 Sep. 3, 2015

(51) Int. Cl.
| | | |
|---|---|---|
| *G01P 15/00* | (2006.01) | |
| *A63B 69/36* | (2006.01) | |
| *G01C 21/16* | (2006.01) | |
| *A63B 69/00* | (2006.01) | |
| *A63B 71/06* | (2006.01) | |
| *A63C 17/01* | (2006.01) | |
| *G06Q 10/06* | (2012.01) | |
| *G09B 19/00* | (2006.01) | |
| *A63C 5/06* | (2006.01) | |
| *A63C 17/26* | (2006.01) | |

(52) U.S. Cl.
CPC .......... *G01C 21/16* (2013.01); *A63B 69/0093* (2013.01); *A63B 71/06* (2013.01); *A63C 5/06* (2013.01); *A63C 17/01* (2013.01); *A63C 17/012* (2013.01); *A63C 17/26* (2013.01); *G06Q 10/0639* (2013.01); *G09B 19/0038* (2013.01); *A63B 2220/40* (2013.01); *A63B 2225/20* (2013.01); *A63B 2225/50* (2013.01); *A63C 2203/18* (2013.01); *A63C 2203/22* (2013.01); *A63C 2203/24* (2013.01); *H04M 2250/12* (2013.01)

(58) Field of Classification Search
CPC combination set(s) only.
See application file for complete search history.

(56) References Cited

U.S. PATENT DOCUMENTS

| 7,379,842 B2 * | 5/2008 | Alexander ......... A63B 24/0021 702/160 |
| 7,739,076 B1 | 6/2010 | Vock et al. |
| 8,108,177 B2 | 1/2012 | Alexander |
| | | (Continued) |

FOREIGN PATENT DOCUMENTS

| EP | 1 846 726 | 6/2009 |
| JP | 2009153856 A | 7/2009 |
| | (Continued) | |

OTHER PUBLICATIONS

Computer-generated translation of JP 2009-153856, published on Jul. 2009.*

(Continued)

*Primary Examiner* — Huan Tran
(74) *Attorney, Agent, or Firm* — Young & Thompson

(57) ABSTRACT

The present invention relates to tracking and analyzing a trajectory of a moving object, like a sports equipment used in an exercise. The present invention to provides a solution for tracking and analyzing a trajectory of a moving object in such a way, that the trajectories can be analyzed and compared to reference data created for the purpose, in order to evaluate and score the movement of the object—including a performance of a person using the object.

7 Claims, 4 Drawing Sheets

(56) References Cited

U.S. PATENT DOCUMENTS

| | | | |
|---|---|---|---|
| 9,285,241 B2* | 3/2016 | Rogel | H04R 1/02 |
| 2006/0167623 A1 | 7/2006 | Alexander | |
| 2007/0110278 A1 | 5/2007 | Vock et al. | |
| 2008/0275670 A1 | 11/2008 | Alexander | |
| 2013/0085713 A1 | 4/2013 | Rogel et al. | |

FOREIGN PATENT DOCUMENTS

| | | |
|---|---|---|
| JP | 2012006485 A | 1/2012 |
| WO | 98/54581 | 12/1998 |
| WO | 2006/081317 | 8/2006 |
| WO | 2012018914 A2 | 2/2012 |

OTHER PUBLICATIONS

Computer-generated translation of JP 2012-006485, published on Jan. 2012.*
GB Search Report, dated Jan. 21, 2013, from corresponding GB application.
Harding et al., "Performance Assessment Innovations for Elite Snowboarding", Procedia Engineering, 2010, vol. 2, pp. 2919-2924.
Harding et al., "Automated scoring for elite half-pipe snowboard competition: important sporting development or techno distraction?", Sports Technology, 2008, vol. 1, No. 6, pp. 277-290.

* cited by examiner

METHOD AND A SYSTEM FOR TRACKING AND ANALYZING A TRAJECTORY OF A MOVING OBJECT, AND FOR PROVIDING A SCORE OF SUCH A TRAJECTORY

FIELD OF THE INVENTION

The present invention relates to tracking and analyzing a trajectory of a moving object, like a sports equipment used in an exercise. Especially in action sports like skateboarding and snowboarding, the overall performance is depending on the execution of certain tricks and movements, where the performer has to take him and his board up in the air. These three-dimensional movements are difficult to track and record, in terms of evaluating and instructing athletes with regard to their performance.

DESCRIPTION OF RELATED ART

European patent application EP1846726 discloses a system for detecting, calculating, and displaying the time-of-flight or "hang-time" of a moving and jumping object such as a skier or snowboarder. Accelerometers are used to determine over a period of time, typically when doing a performance in a particular slope, how long the trajectories are and how much the total "hang-time" amounts to during the run. This time can then be evaluated out of different criteria, i.e. a snowboarder probably wants to be in the air as much as possible, while a skier most likely wants to minimize the same.

In the PCT application document WO9854581 a similar system is presented, where the jumps performed by a snowboarding or ski-boarding person are measured with regard to the duration and also the height of the jump. Acceleration sensors are used also here, and a variety of recording and displaying methods are devised. The recording of the length and height of individual jumps makes it possible to review and compare such data after the performance. However, each jump is measured only in 2 dimensions, time and height, so the use is limited to track each performer's personal improvements in this regard, and perhaps to compare the height of the jumps between friends, and is not suitable to establish a score indicating the quality of the performance as a whole, and to compare it with e.g. independent instructions for an "ideal" jump, or competition rules and standards.

SUMMARY OF THE INVENTION

It is an aim of the present invention to provide a solution for tracking and analyzing a trajectory of a moving object in such a way, that the trajectories can be analyzed and compared to reference data created for the purpose, in order to evaluate and score the movement of the object—including a performance of a person using the object. The invention is characterized by what is presented in the appending claims. Next, the invention will be examined more closely with the aid of a detailed description of preferred embodiments.

BRIEF DESCRIPTION OF THE DRAWINGS

The invention will be described below in detail, with reference to the attached drawings, wherein.

DETAILED DESCRIPTION OF THE INVENTION

Figure 1:
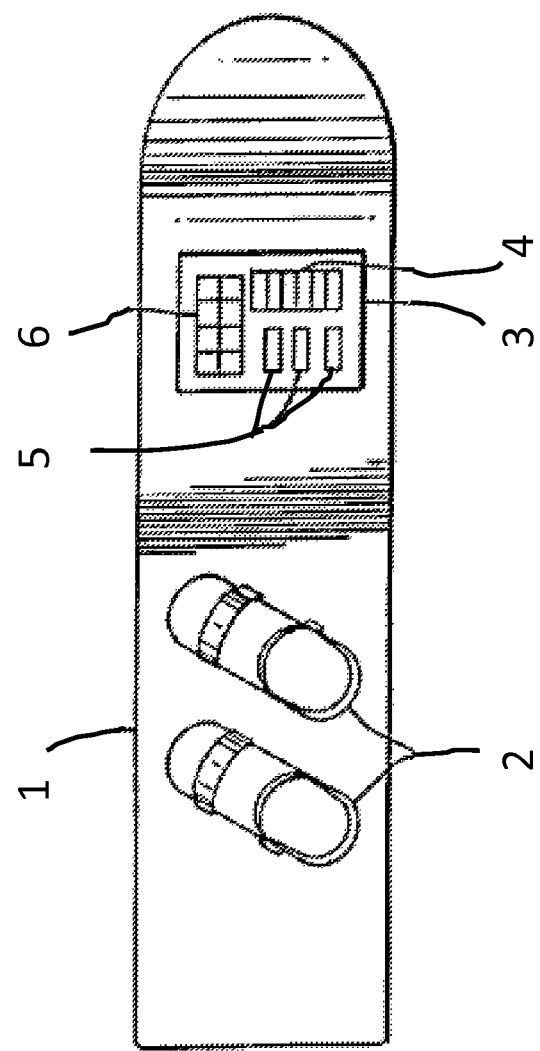
FIG. 1 shows an embodiment of the invention integrated in a snowboard.

FIG. 1 shows a self-contained and standalone unit 3 integrated in a snowboard 1 with boot holders 2. Attaching sensing elements to skateboards, snowboards and other sports equipment like boots, bicycles etc., are known from prior art. According to the present invention, tracking and registering the trajectory in three dimensions is however the key task of the sensors, so instead of complicated speed, height and time measuring sensor setups, the inventive solution is based on having on board sensors only to detect the movement of the object (here a snowboard) in three dimensions. Because the process of evaluating the trajectory is reduced to a comparative operation, the hardware and software setup needed is greatly simplified. The unit 3 incorporates three accelerometer sensors 5, a display 6 and a user interface 4 that provides a user with buttons to select a mode of operation, e.g. between normal performance tracking or new-trick-recording, pre-selection of the trick to be performed, etc. It is also possible to use a single 3D-acceleration sensor in a sensor unit.

Instead of accelerometers, or in combination with them, gyroscopes may be used. Solid-state and low-cost MEMS gyroscopes are nowadays available. Especially in trajectories involving much rotational motion it may become unfeasible to track the movement with only accelerometers. The unit can be stand-alone as in FIG. 1, or have an interface to a computer for later data downloading, or it can be provided with wireless communication with external devices, as shown in FIG. 2.

Figure 2:
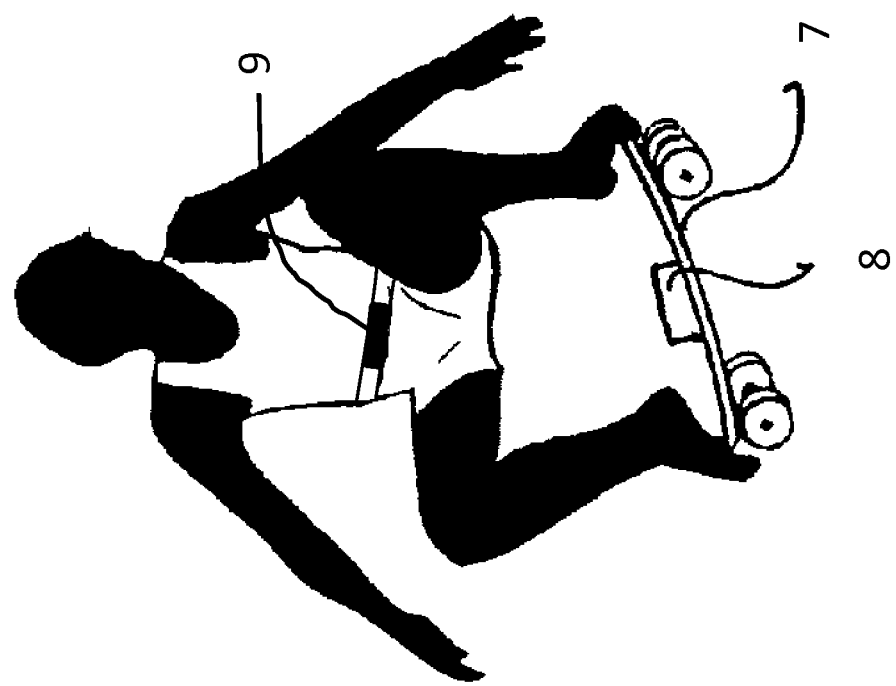
FIG. 2 shows another embodiment of the invention used on a skateboard.

FIG. 2 shows an inventive system consisting of a skateboard 7 with an integrated sensing element 8. The sensor element may locate e.g. at the board surface or hidden at wheel trucks. There may be one sensor unit in one of the trucks, or there may be two sensor units, one in each truck. A central unit 9 carried by the user on his waist, or alternatively wrist. Unit 9 has a wireless communication interface with the sensing element 8. The communication channel used between the sensor unit and the central unit can be e.g. a Bluetooth link, WIFI, NFC or any other low power radio system with a continuous data transfer capability. In a system like the one in FIG. 2, the measuring results may be stored either in the sensing element 8 or the central unit 9, while the score is calculated and presented in a display of the central unit 9. A central unit may also be a mobile phone. As handheld devices like smartphones are getting very sophisticated, such a device (not shown) may also contain a software application for receiving the measurement data and with a scoring algorithm according to the present invention. The score is then visible to the user on his own smartphone right after the performance.

In a further embodiment, as some smartphones also contain built-in accelerometers and gyroscopes, the smartphone device itself can be used as a standalone unit. In such a case no unit integrated in the board or any other equipment is needed. Of course the movements of the human body, and its temporary parting from the sports equipment like in skateboarding, determines if, where and how such a device may be attached to the body, in order to fulfill the requirement of reliable data for the system according to the present invention.

In one further embodiment the sensor unit has a wireless connection with a cellular data transfer system, such as a GSM system. This way the sensor data can be transmitted directly through the network without a central unit for the data transfer.

It is clear to one skilled in the art that the data received and stored in such a device can easily be shared e.g. through social media channels to the peers of the users, to facilitate score tables of live tricks on a website, or to send it forward onto a cloud computing service to induce micropayments related to participation in a competition or a game over the internet. A user can also record and introduce his own tricks. When several users generate trick data and store it in a common network, a commensurable trick data archive with time, location etc. identifiers can be created.

As a non-exclusive example, an algorithm that identifies the trajectories of say the top 20 skateboarding tricks is developed. The recognition is based on data through machine-learning methods, having different users repeating the tricks using a skateboard. Successful performances are recorded by measuring the acceleration rate and direction of the boards as a function of time in 3 dimensions through selected sensors according to the invention.

Figure 3:
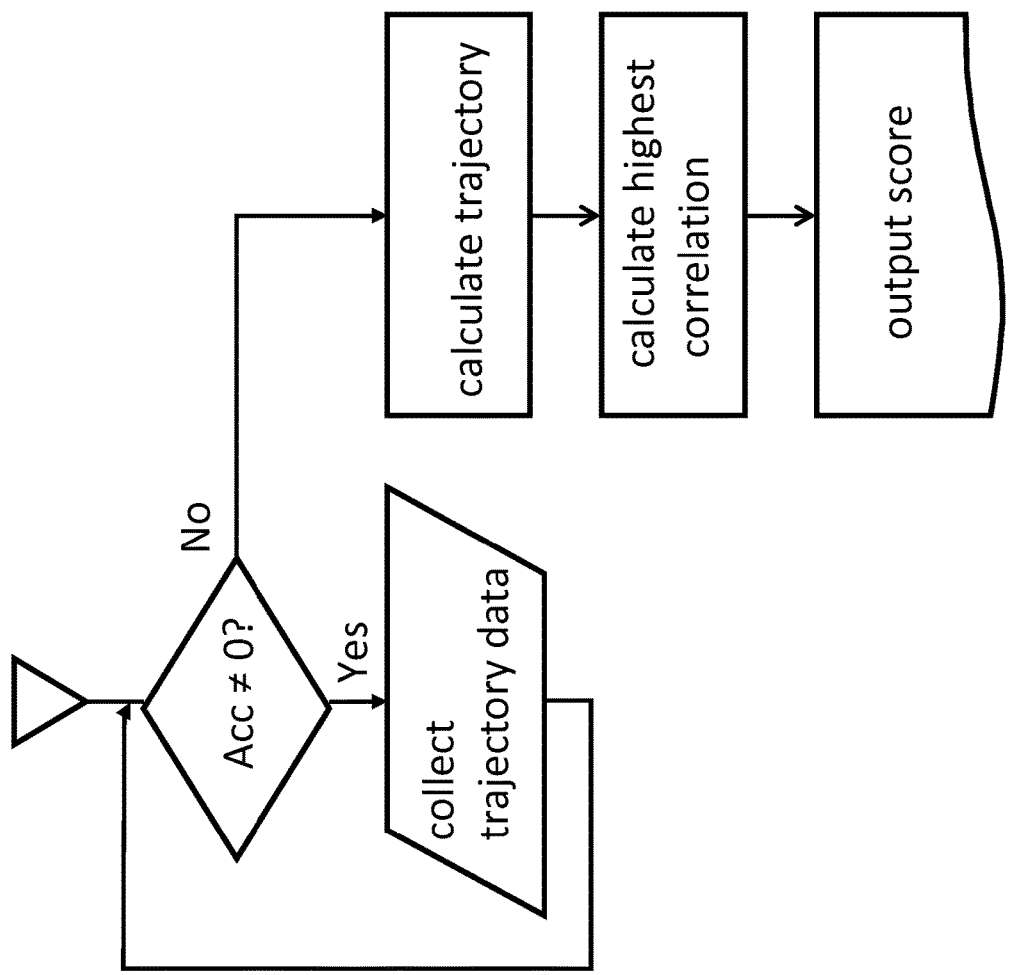
FIG. 3 shows a simplified flowchart diagram of the inventive process.

With reference now to FIG. 3, the algorithm can identifies the start and the end of a performance by recognizing when there is no acceleration (constant speed or standstill). When a user performance is to be evaluated, the system according to the present invention captures the acceleration data of the board between two standstill or constant-speed events, and compares it with the pre-stored trajectories in its memory. According to one embodiment of the invention, the length of the actual performance is scaled in turn to the length of each of the pre-recorded tricks, and the data sets of the actual and pre-recorded trick is compared by calculating the correlation between the two sets of data. The decision on which trick was in question is made based on the highest correlation. For each of the pre-recorded tricks, a score table is defined, e.g:

0 . . . 0.4 poor
0.5 . . . 0.6 passable
0.6 . . . 0.7 satisfactory
0.7 . . . 0.8 good
0.9-1.0 excellent The score is then presented to the user as shown in FIG. 3.

In another embodiment of the invention, the user selects the trick first before trying to do it, whereby the algorithm only performs the correlation calculation on the set of pre-recorded data that corresponds to the selected trick. The selection process to find the highest correlation can then be omitted.

The time scaling of the trajectory, to match a pre-recorded model or target trajectory, plays an important role in the present invention, as it conditions the signals from the sensors and contributes to circumvent the need of difficult timing, speed and distance measurements.

Figure 4:
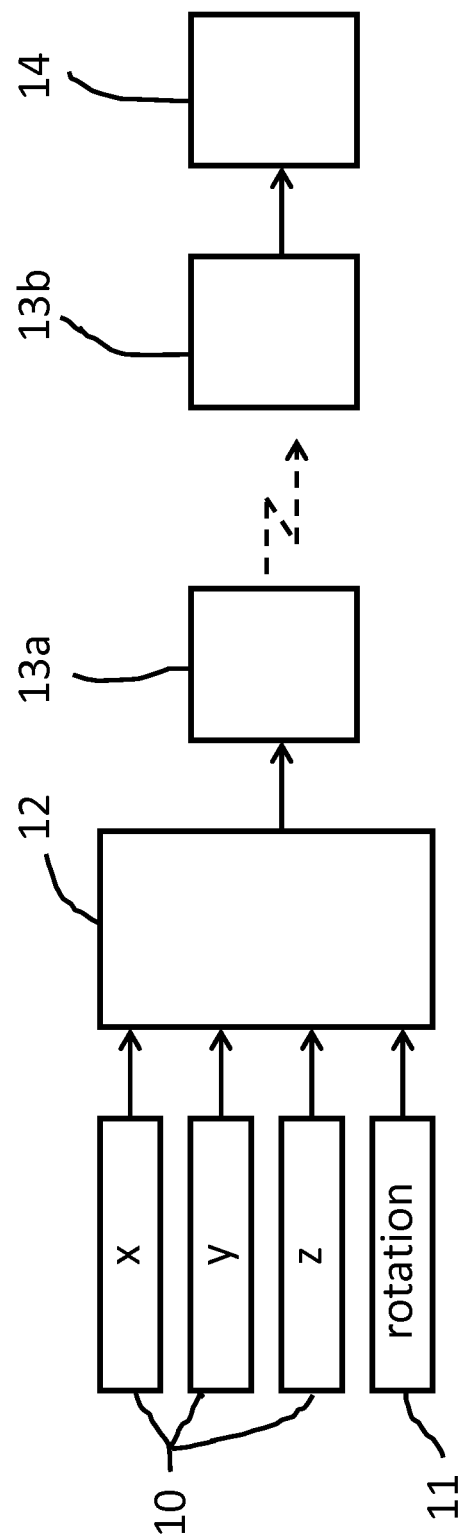
FIG. 4 is a block diagram of a system according to the invention.

In FIG. 4 is presented a block diagram of a system according to the present invention. A system according to the invention consists of various sensors, here accelerometers 10 for the x,y and z axes in a 3-D Cartesian coordinate system, as well as a gyroscope 11. The sensor signals are fed, by wire or by wireless communication, to the central unit 12 that extracts the acceleration, speed and distance data from the signals. From acceleration and time data, the speed and distance of the object in all three directions can be easily calculated. With one or more gyroscopes 11, the sensors may provide a full 6 component motion sensing; acceleration for X, Y and Z movement, and the extent and rate of rotation in space (roll, pitch and yaw). Such sensing systems adapted to handheld and end-user appliances are known from modern smartphones and gaming gear. The number and configuration of sensors fixed on sport equipment, obviously depend on the various motions that reasonably can be expected from such equipment in normal use.

The central unit produces a trajectory curve of the movement of the object where the sensors reside, and also calculates the score, as explained above. A RF, e.g. a Bluetooth interface 13a provides a wireless link to a corresponding interface 13b of a user device 14, such as a smartphone or a laptop computer with internet connection.

The tricks are recognized and evaluated by calculation and comparison to target reference data of certain known tricks. The storage of the reference data as well as the calculation and comparison can be implemented in the central unit or in the network or distributed in both central unit and network. It is also possible that the user trick data is stored in the network and used for recognizing new tricks which can be further used as new target reference trick data. The users can thus teach new tricks to the system.

It is clear to one skilled in the art that the invention is not restricted to the examples and embodiments presented above, but may vary within the scope of the appended claims.

The invention claimed is:

1. A method for tracking and analyzing a trajectory of a moving object by measuring the acceleration and direction of said object, and for producing a set of position data and by saving said position data in a memory as a data set;
the method comprising steps of:
defining at least one trajectory as a target trajectory along which said moving object should move;
retrieving from said memory said data set of position data;
analyzing said position data to produce a trajectory of said moving object;
comparing said trajectory to said predefined target trajectory; and
producing a score indicative of how closely said trajectory of the moving object follows said target trajectory, wherein the data set of position data is compared to at least two data sets of predefined target trajectories, whereby the length of the actual performance is scaled to the length of each of the predefined trajectories, and the selection of the predefined trajectory closest to the trajectory of the moving object is done by calculating the correlation between each of the predefined trajectories and said trajectory of the moving object, and producing a score based on said correlation and indicative of how closely said trajectory of the moving object follows said selected target trajectory.

2. A method according to claim 1, wherein the selected target trajectory is informed to the user as a recognized trick.

3. A method according to claim 1, wherein the data set of position data is compared to a data set of a target trajectory pre-selected by the user, whereby the length of the actual performance is scaled to the length of the pre-selected and predefined trajectory, the correlation between the predefined trajectory and said trajectory of the moving object is calculated, and producing a score based on said correlation and indicative of how closely said trajectory of the moving object follows said selected target trajectory.

4. A system for tracking and analyzing a trajectory of a moving object (1;7), including sensors (5; 10, 11) for measuring the acceleration and direction of said object, and means for producing a set of position data of said object for saving said position data in a memory as a data set;

wherein the system comprises means (3; 8; 12) for retrieving from said memory said data set of position data and to produce a trajectory of said moving object, means to compare said trajectory to a predefined target trajectory, and means to produce a score indicative of how closely said trajectory of the moving object follows said target trajectory, wherein the data set of position data is compared to at least two data sets of predefined target trajectories, whereby the length of the actual performance is scaled to the length of each of the predefined trajectories, and the selection of the predefined trajectory closest to the trajectory of the moving object is done by calculating the correlation between each of the predefined trajectories and said trajectory of the moving object, and producing a score based on said correlation and indicative of how closely said trajectory of the moving object follows said selected target trajectory.

5. A system according to claim 4, wherein the sensors (10, 11) and the means (12) for measuring the movement and producing and saving the position data for said object is integrated in the sports equipment, together with a wireless interface (13*a*).

6. A system according to claim 5, wherein the target trajectory is a trajectory of a predefined skateboard trick or a snowboard trick.

7. A system according to claim 4, wherein the target trajectory is a trajectory of a predefined skateboard trick or a snowboard trick.

* * * * *